United States Patent
Yanagisawa

(10) Patent No.: US 7,667,812 B2
(45) Date of Patent: Feb. 23, 2010

(54) LIQUID CRYSTAL DISPLAY APPARATUS COMPRISING SPACERS

(75) Inventor: Masaki Yanagisawa, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 529 days.

(21) Appl. No.: 11/710,813

(22) Filed: Feb. 26, 2007

(65) Prior Publication Data
US 2007/0200994 A1 Aug. 30, 2007

(30) Foreign Application Priority Data
Feb. 28, 2006 (JP) .............................. 2006-051633

(51) Int. Cl.
*G02F 1/1339* (2006.01)
*G02F 1/1337* (2006.01)
(52) U.S. Cl. .................... 349/155; 349/126; 349/156
(58) Field of Classification Search ................. 349/126, 349/155, 156
See application file for complete search history.

(56) References Cited

U.S. PATENT DOCUMENTS

| | | | | |
|---|---|---|---|---|
| 7,245,343 | B2 * | 7/2007 | Suzuki et al. | ............... 349/153 |
| 2003/0071959 | A1 * | 4/2003 | Koyama | ..................... 349/156 |
| 2004/0169797 | A1 | 9/2004 | Fujita et al. | |
| 2005/0036096 | A1 * | 2/2005 | Takatori et al. | ............. 349/156 |
| 2005/0237469 | A1 | 10/2005 | Kadotani et al. | |

FOREIGN PATENT DOCUMENTS

| | | |
|---|---|---|
| JP | 2002-214621 A | 7/2002 |
| JP | 2004-271886 A | 9/2004 |
| JP | 2005-017494 A | 1/2005 |

OTHER PUBLICATIONS

The International Search Report and Written Opinion of the International Searching Authority dated May 25, 2007 for PCT/JP2007/054130 filed Feb. 27, 2007, 11 sheets.

* cited by examiner

*Primary Examiner*—David Nelms
*Assistant Examiner*—David Y Chung
(74) *Attorney, Agent, or Firm*—Frishauf, Holtz, Goodman & Chick, P.C.

(57) ABSTRACT

A liquid crystal display apparatus includes a first substrate provided with an alignment film on one surface thereof, and a second substrate provided with an alignment film on one surface thereof. The first and second substrates are arranged to oppose each other with the alignment films inside the opposed first and second substrates. Spacers are interposed between the first and second substrates, and pixels are arranged in a matrix in the display apparatus. The spacers are arranged such that, along a direction of rubbing treatment for the alignment film of the second substrate, not more than one spacer is provided per pixel, at least one spacer is present per three consecutive pixels, and no three consecutive pixels all have a respective spacer corresponding thereto.

26 Claims, 3 Drawing Sheets

LIQUID CRYSTAL DISPLAY APPARATUS COMPRISING SPACERS

CROSS-REFERENCE TO RELATED APPLICATIONS

This application is based upon and claims the benefit of priority from prior Japanese Patent Application No. 2006-051633, filed Feb. 28, 2006, the entire contents of which are incorporated herein by reference.

BACKGROUND OF THE INVENTION

1. Field of the Invention

The present invention relates to a liquid crystal display apparatus having spacers between the substrates of the liquid crystal display apparatus.

2. Description of the Related Art

In a conventional liquid crystal display apparatus described in Jpn. Pat. Appln. KOKAI Publication No. 2002-214621, R (red), G (green), and B (blue) pixel regions are arranged in stripes, and columnar spacers are arranged in non-pixel regions arranged between the R pixel regions and B pixel regions respectively located upstream and downstream in the direction of rubbing treatment. This prevents an alignment defect resulting from the columnar spacers from occurring in the G pixel region, which has a visual sensitivity that is higher than visual sensitivities of the R pixel region and B pixel region. As a result, a display nonuniformity due to the alignment defect resulting from the columnar spacers will not be observed easily.

In the conventional liquid crystal display apparatus described above, columnar spacers are arranged regularly in the non-pixel regions between the R pixel regions and B pixel regions respectively located upstream and downstream in the direction of rubbing treatment. Namely, the columnar spacers are arranged in all the non-pixel regions downstream of all the R pixel regions in the direction of rubbing treatment. The columnar spacers are thus arranged consecutively with respect to the R pixel regions located in the direction of rubbing treatment. With this structure, an alignment defect resulting from the consecutively arranged columnar spacers is observed as a display abnormality on a straight line extending in the direction of rubbing treatment.

BRIEF SUMMARY OF THE INVENTION

An object of the present invention is to provide a liquid crystal display apparatus in which an alignment defect resulting from the spacers will not be easily observed as a display abnormality on a straight line extending in the direction of rubbing treatment.

A liquid crystal display apparatus according to the present invention includes a first substrate provided with an alignment film on one surface thereof, and a second substrate provided with an alignment film on one surface thereof. The first and second substrates are arranged to oppose each other with the alignment films inside the opposed first and second substrate. Spacers are interposed between the first and second substrates, and pixels are arranged in a matrix in the display apparatus. The spacers are arranged such that, along a direction of rubbing treatment for the alignment film of the second substrate, not more than one spacer is provided per pixel, at least one spacer is present per three consecutive pixels, and no three consecutive pixels all have a respective spacer corresponding thereto.

According to the present invention, the spacers are arranged intermittently along the direction of rubbing treatment. As a result, an alignment defect resulting from the spacers will not be easily observed as a display abnormality on the straight line extending in the direction of rubbing treatment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
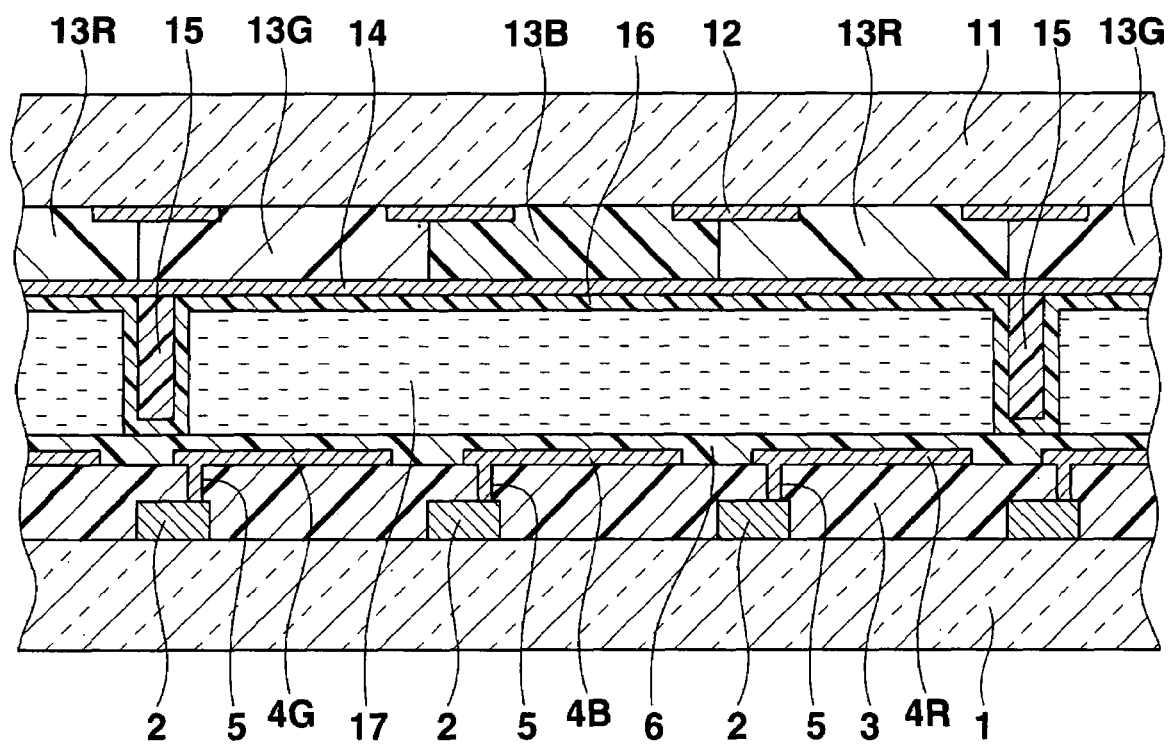
FIG. 1 is a sectional view showing the main part of a liquid crystal display apparatus according to an embodiment of the present invention.

FIG. 1 is a sectional view showing the main part of a liquid crystal display apparatus according to an embodiment of the present invention. This liquid crystal display apparatus is of an active matrix type and includes a first substrate, i.e., an active substrate 1, and a second substrate, i.e., a countersubstrate 11. The active substrate 1 and countersubstrate 11 are formed by glass substrates. Thin film transistors 2 serving as switching elements are formed in a matrix on the upper surface (an inner surface opposing the countersubstrate 11) of the active substrate 1.

An overcoat film 3 is formed on the upper surface of the active substrate 1 and on the thin film transistors 2. Red-, green-, and blue-display pixel electrodes 4R, 4G, and 4B are formed on the upper surface of the overcoat film 3. The pixel electrodes 4R, 4G, and 4B are respectively connected to corresponding thin film transistors 2 through contact holes 5 formed in the overcoat film 3. An alignment film 6 is formed on the upper surface of the overcoat film 3 and on the pixel electrodes 4R, 4G, and 4B.

The end of the drain electrode of each thin film transistor 2 is arranged on one end side of an operational semiconductor layer, made of amorphous silicon (a-Si) or the like, on a gate electrode. The source electrode of each thin film transistor 2 is formed so that the end thereof is arranged on the other end side of the semiconductor layer. The source electrode connects to a pixel electrode 4R, 4G, or 4B through a corresponding contact hole 5.

Light-shielding films 12 and red, green, and blue color filter elements 13R, 13G, and 13B are formed on the lower surface (an inner surface opposing the active substrate 1) of the countersubstrate 11. A counterelectrode, i.e., a common electrode 14, is formed to cover the lower surfaces of the color filter elements 13R, 13B, and 13B. Columnar spacers 15 are arranged at predetermined portions of the lower surface of the common electrode 14 between the color filter elements 13R and 13G. An alignment film 16 is formed on the lower surface of the common electrode 14 and on the surfaces (i.e., lower and side surfaces as shown in FIG. 1) of the columnar spacers 15. In this case, the columnar spacers 15 and the alignment film 16 formed on the surfaces of the columnar spacers 15 constitute a practical columnar spacer.

The active substrate 1 and countersubstrate 11 adhere to each other via an almost square frame-shaped seal member (not shown) interposed between them. In this state, the lower surface of the practical columnar spacer is in contact with the upper surface of the alignment film 6 of the active substrate 1. The active substrate 1 and countersubstrate 11 are arranged to oppose each other with an almost constant gap therebetween, with the alignment films 6 and 16 provided inside of the gap between the active substrate 1 and countersubstrate 11. The alignment films 6 and 16 of the two substrates 1 and 11 seal a liquid crystal 17 inside the seal member.

Figure 2:
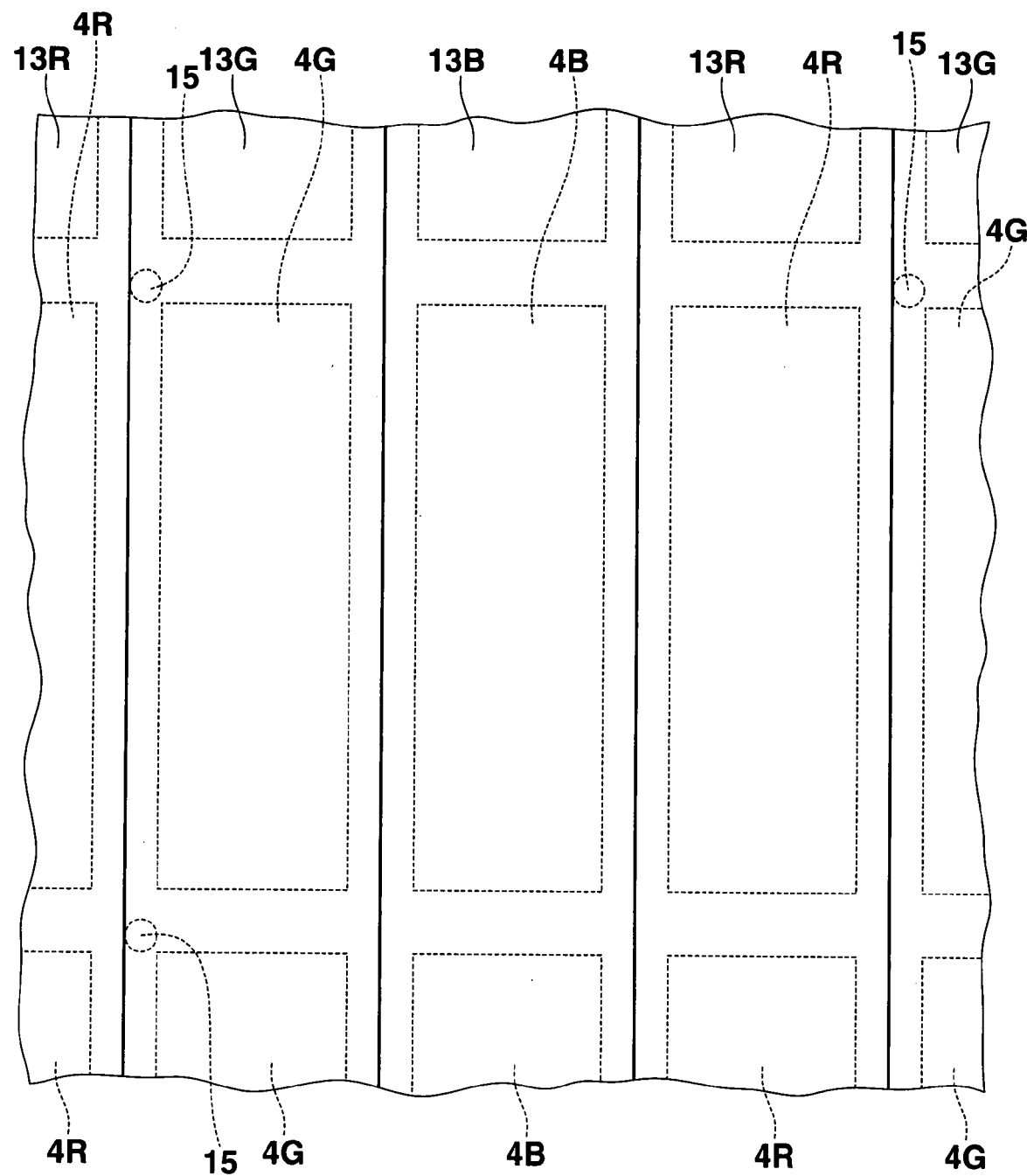
FIG. 2 shows a planar arrangement relationship among some color filter elements, some pixel electrodes, and some columnar spacers.

FIG. 2 shows a planar arrangement relationship among some color filter elements 13R, 13G, and 13B, some pixel electrodes 4R, 4G, and 4B, and some columnar spacers 15. The color filter elements 13R, 13G, and 13B extend in a column direction of the liquid crystal display (a direction along which columns of pixels of the display extend) and are arranged in stripes. The vertically elongated pixel electrodes 4R, 4G, and 4B are arranged under the color filter elements 13R, 13G, and 13B at the same pitch in the column direction.

Display regions of the liquid crystal display apparatus are formed by regions where the pixel electrodes 4R, 4G, and 4B and color filter elements 13R, 13G, and 13B overlap, excluding regions where the light-shielding film 12 and thin film transistors 2 are provided. The remaining region, e.g., a portion among the pixel electrodes 4R, 4G, and 4B, forms a substantially grid-like non-display region. The pixel electrodes 4R, 4G, and 4B arranged close to each other in the row direction of the liquid crystal display apparatus (the direction along which rows of pixels of the liquid crystal display apparatus extend). Three pixel electrodes 4R, 4G, 4B, (i.e., one each of red, green and blue) form one pixel. The columnar spacers 15 are arranged in the non-display regions on the upper left of the green-display pixel electrodes 4G as viewed from the top (i.e., when looking down at the upper, or outer, surface of the countersubstrate 11). However, the columnar spacers 15 are absent in some cases, as will be described hereinafter.

Figure 3:
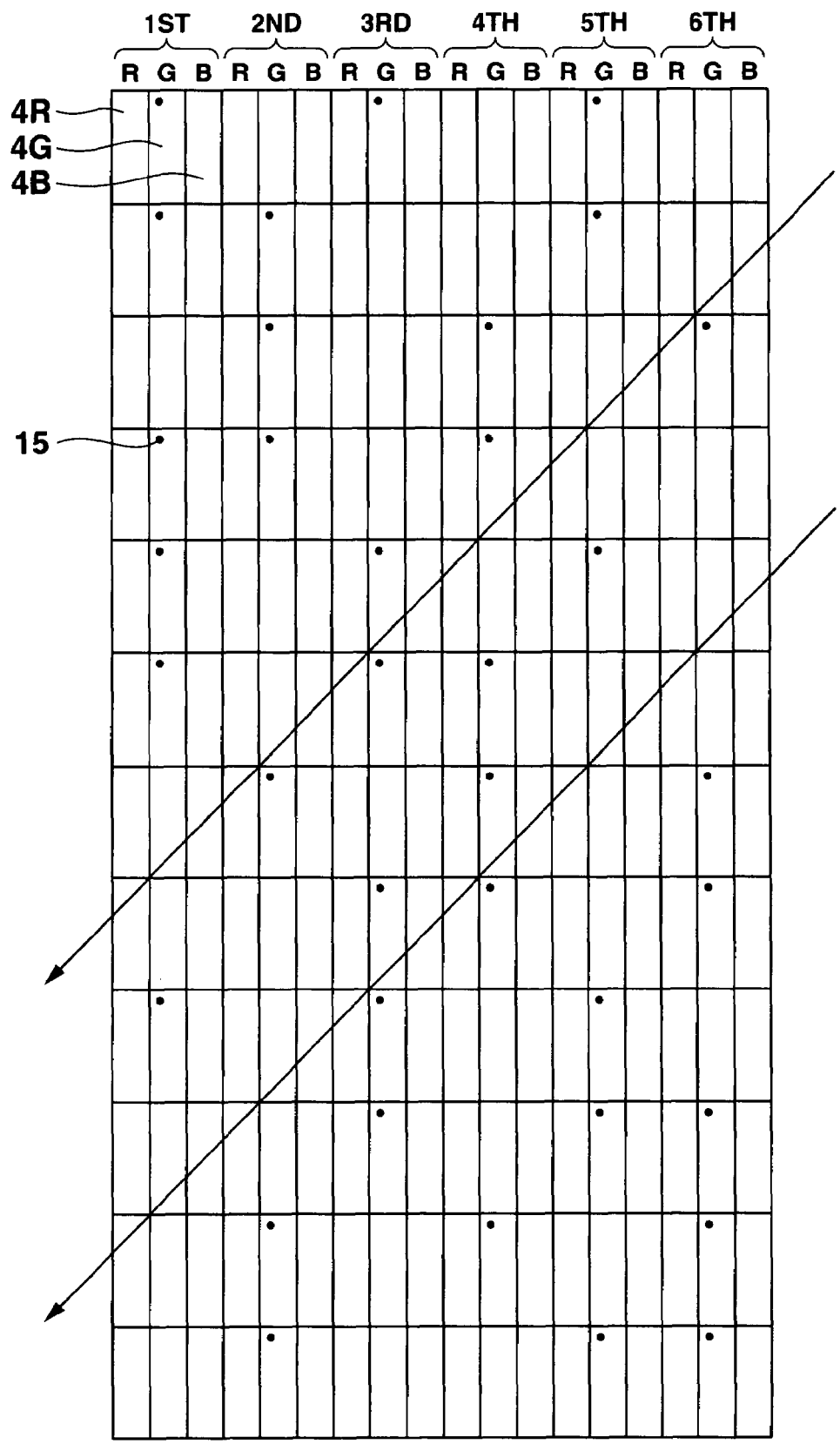
FIG. 3 shows a planar arrangement relationship between some pixel electrodes and some columnar spacers.

FIG. 3 shows a planar arrangement relationship between some pixel electrodes 4R, 4G, and 4B and some columnar spacers 15. Referring to FIG. 3, the vertically elongated rectangular regions defined by (surrounded by) vertical lines and horizontal lines indicate the pixel electrodes 4R, 4G, and 4B. The black dots formed on the upper left corners of specific green-display pixel electrodes 4G indicate the columnar spacers 15.

Referring to FIG. 3, the pixel electrodes 4R, 4G, and 4G for respectively displaying red, green, and blue are arranged in stripes. The pixel electrodes 4R, 4G, and 4B constitute pixels arranged in a matrix. Each pixel includes three pixel electrodes 4R, 4G, and 4B arranged close to each other in the row direction. Each pixel has a substantially (or almost) square shape. The number of columnar spacers 15 is smaller than the number of pixels.

The columnar spacers 15 indicated by the black dots in FIG. 3 are arranged arbitrarily in a random manner. In the example shown in FIG. 3, among the pixels of the 1st column, the columnar spacers 15 are arranged at the upper left corners of the pixel electrodes 4G in the 1st, 2nd, 4th, 5th, 6th, and 9th rows. Among the pixels of the 2nd column, the columnar spacers 15 are arranged at the upper left corners of the pixel electrodes 4G in the 2nd, 3rd, 4th, 7th, 11th, and 12th rows. Among the pixels of the 3rd column, the columnar spacers 15 are arranged at the upper left corners of the pixel electrodes 4G in the 1st, 5th, 6th, 8th, 9th, and 10th rows. Among the pixels of the 4th column, the columnar spacers 15 are arranged at the upper left corners of the pixel electrodes 4G in the 3rd, 4th, 6th, 7th, 8th, and 11th rows. Among the pixels of the 5th column, the columnar spacers 15 are arranged at the upper left corners of the pixel electrodes 4G in the 1st, 2nd, 5th, 9th, 10th, and 12th rows. And in the 6th column shown in FIG. 3, the columnar spacers 15 are arranged at the upper left corners of the pixel electrodes 4G of the 3rd, 7th, 8th, 10th, 11th, and 12th rows.

The arrows running from the upper right to the lower left of FIG. 3 indicate the direction of rubbing treatment, as seen from the upper surface side of the countersubstrate 11, with respect to the alignment film 16 of the countersubstrate 11 shown in FIG. 1. A direction of rubbing treatment for the alignment film of the second substrate is parallel to a diagonal of each pixel. Along the direction of rubbing treatment indicated by the arrows in FIG. 3, at least one columnar spacer 15 is present per three consecutive pixels, although one or less columnar spacer 15 is provided per pixel, and the columnar spacers 15 are arranged such that no three consecutive pixels along the direction of the rubbing treatment all have a respective columnar spacer corresponding thereto. In other words, the columnar spacers 15 are arranged so that, along the direction of rubbing treatment indicated by the arrows, not more than one spacer is provided per pixel, at least one spacer is present per three consecutive pixels, and no three consecutive pixels along the direction of the rubbing treatment all have a respective columnar spacer corresponding thereto. That is, not more than one columnar spacer is provided per pixel, and at least one, but not more than two, columnar spacers are provided per three consecutive pixels along the direction of the rubbing treatment.

As a result, the columnar spacers 15 are intermittently arranged along the direction of rubbing treatment. This prevents an alignment defect resulting from the columnar spacers 15 from being easily observed as a display abnormality on a straight line extending in the direction of rubbing treatment.

In the row direction, at least one columnar spacer 15 is present per three consecutive pixels, although one or less columnar spacer 15 is provided per pixel, and the columnar spacers 15 are arranged such that no three consecutive pixels along the row direction all have a respective columnar spacer corresponding thereto. In other words, along the row direction, the columnar spacers 15 are arranged so that not more than one spacer is provided per pixel, at least one spacer is present per three consecutive pixels, and no three consecutive pixels along the row direction all have a respective columnar spacer corresponding thereto. That is, not more than one columnar spacer is provided per pixel, and at least one, but not more than two, columnar spacers are provided per three consecutive pixels along the row direction.

In the column direction, at least one columnar spacer 15 is present per four consecutive pixels, although one or less columnar spacer 15 is provided per pixel, and the columnar spacers 15 are arranged such that no four consecutive pixels along the column direction all have a respective columnar spacer corresponding thereto. In other words, along the column direction, the columnar spacers 15 are arranged so that not more than one spacer is provided per pixel, at least one spacer is present per four consecutive pixels, and no four consecutive pixels along the column direction all have a respective columnar spacer corresponding thereto. That is, not more than one columnar spacer is provided per pixel, and at least one, but not more than three, columnar spacers are provided per four consecutive pixels along the column direction.

This arrangement of columnar spacers along the row and column directions further prevents an aligning defect resulting from the columnar spacers 15 from being easily observed as a display abnormality on a straight line extending in the direction of rubbing treatment. In this case, the columnar spacers 15 are consecutively arranged on up to three pixels in the direction of column and not on four or more pixels, because a display abnormality due to an aligning defect resulting from the columnar spacers 15 does not stand out in the direction of column.

As shown in FIG. 3, a rectangular region including six pixels in the row direction and 12 pixels in the column direction is defined as a reference region. Predetermined numbers of such reference regions are arranged in the row direction and the column direction to constitute the entire pixel region of one liquid crystal display apparatus. In this case, the number of columnar spacers 15 arranged in each column in the reference region shown in FIG. 3 is six, which is half the number of pixels in each column in the reference region, and the number of columnar spacers 15 arranged in each row in the reference region shown in FIG. 3 is three, which is half the number of pixels in each row in the reference region. Accordingly, the number of spacers arranged in each column in the reference region is the same, and the number of spacers arranged in each row in the reference region is the same. Thus, in the reference region, even if the columnar spacers 15 are arranged arbitrarily in a random manner, they are arranged almost uniformly, to ensure uniform thickness of the liquid crystal layer.

In the above embodiment, as shown in FIG. 2, the columnar spacers 15 are arranged in the upper left non-display regions of the green-display pixel electrodes 4G. However, the present invention is not limited to this. The columnar spacers 15 may be arranged in the upper left non-display regions of the red-display pixel electrodes 4R, or the upper left non-display regions of the blue-display pixel electrodes 4B. Also, the columnar spacers 15 may be arranged at arbitrary random positions of the non-display regions of the pixel electrodes 4R, 4G, and 4B, irrespective of what color corresponds to the pixel electrode.

In the above embodiment, the present invention is applied to an active matrix type color liquid crystal display apparatus. However, the present invention is not limited to this, and can also be applied to a simple matrix type color liquid crystal display apparatus, or a monochrome active matrix type or simple matrix type liquid crystal display apparatus.

In the above embodiment, along the row direction, the spacers 15 are arranged so that not more than one spacer is provided per pixel, at least one spacer is present per three consecutive pixels, and no three consecutive pixels along the row direction all have a respective columnar spacer corresponding thereto. However, the present invention is not limited to this. Along the row direction, the spacers 15 may be arranged so that not more than one spacer is provided per pixel, at least one spacer is present per three consecutive pixels, and no two consecutive pixels along the row direction both have a respective columnar spacer corresponding thereto.

In the above embodiment, along the column direction, the spacers 15 are arranged so that not more than one spacer is provided per pixel, at least one spacer is present per four consecutive pixels, and no four consecutive pixels along the column direction all have a respective columnar spacer corresponding thereto. However, the present invention is not limited to this. Along the column direction, the spacers 15 may be arranged so that not more than one spacer is provided per pixel, at least one spacer is present per three consecutive pixels, and no three consecutive pixels along the column direction all have a respective columnar spacer corresponding thereto. Alternatively, along the column direction, the spacers 15 may be arranged so that not more than one spacer is provided per pixel, at least one spacer is present per three consecutive pixels, and no two consecutive pixels along the column direction both have a respective columnar spacer corresponding thereto.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
   a first substrate provided with an alignment film on one surface thereof;
   a second substrate provided with an alignment film on one surface thereof, the first and second substrates being arranged to oppose each other with the alignment films positioned inside the opposed first and second substrates;
   a plurality of spacers interposed between the first and second substrates; and
   a plurality of pixels arranged in a matrix;
   wherein the spacers are arranged such that, along a direction of rubbing treatment for the alignment film of the second substrate, not more than one spacer is provided per pixel, at least one spacer is present per three consecutive pixels, and no three consecutive pixels all have a respective spacer corresponding thereto.

2. A device according to claim 1, wherein the spacers are arranged such that, along a row direction of the pixels, not more than one spacer is provided per pixel, at least one spacer is present per three consecutive pixels, and no three consecutive pixels all have a respective spacer corresponding thereto.

3. A device according to claim 2, wherein the spacers are arranged such that, along a column direction of the pixels, not more than one spacer is provided per pixel, at least one spacer is present per four consecutive pixels, no four consecutive pixels all have a respective spacer corresponding thereto.

4. A device according to claim 2, wherein the spacers are arranged such that, along a column direction of the pixels, not more than one spacer is provided per pixel, at least one spacer is present per three consecutive pixels, and no three consecutive pixels all have a respective spacer corresponding thereto.

5. A device according to claim 2, wherein the spacers are arranged such that, along a column direction of the pixels, not more than one spacer is provided per pixel, at least one spacer is present per three consecutive pixels, and no two consecutive pixels both have a respective spacer corresponding thereto.

6. A device according to claim 1, wherein the spacers are arranged such that, along a row direction of the pixels, not more than one spacer is provided per pixel, at least one spacer is present per three consecutive pixels, and no two consecutive pixels both have a respective spacer corresponding thereto.

7. A device according to claim 6, wherein the spacers are arranged such that, along a column direction of the pixels, not more than one spacer is provided per pixel, at least one spacer is present per four consecutive pixels, and no four consecutive pixels all have a respective spacer corresponding thereto.

8. A device according to claim 6, wherein the spacers are arranged such that, along a column direction of the pixels, not more than one spacer is provided per pixel, at least one spacer is present per three consecutive pixels, and no three consecutive pixels all have a respective spacer corresponding thereto.

9. A device according to claim 6, wherein the spacers are arranged such that, along a column direction of the pixels, not more than one spacer is provided per pixel, at least one spacer is present per three consecutive pixels, and no three consecutive pixels all have a respective spacer corresponding thereto.

10. A device according to claim 1, wherein each pixel is substantially square and comprises three pixel electrodes arranged close to each other in a row direction of the pixels to respectively display red, green, and blue, and the direction of rubbing treatment is parallel to a diagonal of each pixel.

11. A device according to claim 1, wherein the spacers are columnar.

12. A device according to claim 1, wherein an entire pixel region of the liquid crystal display apparatus comprises rectangular reference regions, each including a predetermined number of pixels along a row direction of the pixels and a predetermined number of pixels along a column direction of the pixels, and, for each of the reference regions, a number of spacers arranged in each row of is the same and a number of spacers arranged in each column is the same.

13. A device according to claim 1, wherein each spacer is arranged in a non-display region in the vicinity of a pixel corresponding thereto.

14. A device according to claim 1, further comprising red, green, and blue color filter elements arranged in stripes and extending in a column direction of the pixels.

15. A liquid crystal display comprising:
a first substrate provided with an alignment film on one surface thereof;
a second substrate provided with an alignment film on one surface thereof, the first and second substrates being arranged to oppose each other with the alignment films positioned inside the opposed first and second substrates;
a plurality of spacers interposed between the first and second substrates and fixed to one of the first and second substrates; and
a plurality of pixel electrodes arranged in stripes to display red, green, and blue;
wherein the pixel electrodes form pixels that are arranged in a matrix, and each pixel is substantially square and comprises three pixel electrodes arranged close to each other in a row direction of the pixels to respectively display red, green, and blue;
wherein a direction of rubbing treatment for the alignment film of the second substrate is parallel to a diagonal of each pixel; and
wherein the spacers are arranged such that, along the direction of rubbing treatment for the alignment film of the substrate to which the spacers are fixed, not more than one spacer is provided per pixel, at least one spacer is present per three consecutive pixels, and no three consecutive pixels all have a respective spacer corresponding thereto.

16. A device according to claim 15, wherein an entire pixel region of the liquid crystal display apparatus comprises rectangular reference regions, each including a predetermined number of pixels along the row direction of the pixels and a predetermined number of pixels along a column direction of the pixels, and, for each of the reference regions, a number of spacers arranged in each row is the same and a number of spacers arranged in each column is the same.

17. A device according to claim 15, wherein each spacer is arranged in a non-display region in the vicinity of a pixel corresponding thereto.

18. A device according to claim 15, further comprising red, green, and blue color filter elements arranged in stripes and extending in a column direction of the pixels.

19. A liquid crystal display comprising:
a first substrate provided with an alignment film on one surface thereof;
a second substrate provided with an alignment film on one surface thereof, the first and second substrates being arranged to oppose each other with the alignment films positioned inside the opposed first and second substrates;
a plurality of spacers interposed between the first and second substrates and fixed to one of the first and second substrates; and
a plurality of pixel electrodes arranged in stripes to display red, green, and blue;
wherein the pixel electrodes form pixels arranged in a matrix, and each pixel is substantially square and comprises three pixel electrodes arranged close to each other in a row direction of the pixels to respectively display red, green, and blue;
wherein a direction of rubbing treatment for the alignment film of the second substrate is parallel to a diagonal of each pixel; and
wherein the spacers are arranged such that, along the row direction, not more than one spacer is provided per pixel, at least one spacer is present per three consecutive pixels, and no three consecutive pixels all have a respective spacer corresponding thereto.

20. A device according to claim 19, wherein an entire pixel region of the liquid crystal display apparatus comprises rectangular reference regions, each including a predetermined number of pixels along the row direction and a predetermined number of pixels along a column direction of the pixels, and, for each of the reference regions, a number of spacers arranged in each row is the same and a number of spacers arranged in each column is the same.

21. A device according to claim 19, wherein each spacer is arranged in a non-display region in the vicinity of a pixel corresponding thereto.

22. A device according to claim 19, further comprising red, green, and blue color filter elements arranged in stripes and extending in a column direction of the pixels.

23. A liquid crystal display comprising:
a first substrate provided with an alignment film on one surface thereof;
a second substrate provided with an alignment film on one surface thereof, the first and second substrates being arranged to oppose each other with the alignment films positioned inside the opposed first and second substrates;
a plurality of spacers interposed between the first and second substrates and fixed to one of the first and second substrates; and
a plurality of pixel electrodes arranged in stripes to display red, green, and blue;
wherein the pixel electrodes form pixels that are arranged in a matrix, and each pixel is substantially square and comprises three pixel electrodes arranged close to each other in a row direction of the pixels to respectively display red, green, and blue;

wherein a direction of rubbing treatment for the alignment film of the second substrate is parallel to a diagonal of each pixel; and wherein the spacers are arranged such that, along a column direction of the pixels, not more than one spacer is provided per pixel, at least one spacer is present per four consecutive pixels, and no four consecutive pixels all have a respective spacer corresponding thereto.

24. A device according to claim 23, wherein an entire pixel region of the liquid crystal display apparatus comprises rectangular reference regions, each including a predetermined number of pixels along the row direction of the pixels and a predetermined number of pixels along the column direction, and, for each of the reference regions, a number of spacers arranged in each row is the same and a number of spacers arranged in each column is the same.

25. A device according to claim 23, wherein each spacer is arranged in a non-display region in the vicinity of a pixel corresponding thereto.

26. A device according to claim 23, further comprising red, green, and blue color filter elements arranged in stripes and extending in the column direction.

* * * * *